United States Patent
Arroyo Villan et al.

(10) Patent No.: US 9,162,430 B2
(45) Date of Patent: Oct. 20, 2015

(54) COATED SUBSTRATES AND PACKAGES PREPARED THEREFROM

(75) Inventors: Maria Isabel Arroyo Villan, Tarragona (ES); Angels Domenech, La Selva del Camp (ES); Karl Zuercher, Samstagern (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/377,917

(22) PCT Filed: Jul. 16, 2010

(86) PCT No.: PCT/US2010/042319
§ 371 (c)(1),
(2), (4) Date: Dec. 13, 2011

(65) Prior Publication Data
US 2012/0094563 A1    Apr. 19, 2012

(30) Foreign Application Priority Data
Jul. 17, 2009    (EP) ..................................... 09382115

(51) Int. Cl.
*B32B 3/00* (2006.01)
*B32B 27/32* (2006.01)
(Continued)

(52) U.S. Cl.
CPC . *B32B 27/12* (2013.01); *B32B 7/02* (2013.01); *B32B 27/32* (2013.01); *Y10T 442/20* (2015.04)

(58) Field of Classification Search
USPC ............... 442/59, 62, 85, 290, 398; 428/34.1, 428/34.9, 35.2, 35.7, 35.9, 36.1
See application file for complete search history.

(56) References Cited

U.S. PATENT DOCUMENTS

| 3,660,150 A | 5/1972 | Cooper |
| 4,291,082 A | 9/1981 | Stall |

(Continued)

FOREIGN PATENT DOCUMENTS

| JP | 59011250 A | 1/1984 |
| JP | 2001030446 A | 2/2001 |

(Continued)

OTHER PUBLICATIONS

Flexomer™ ETS-9078 nt 7. In (2003). Technical Information. DOW Chemical Company. Retrieved from http://catalog.ides.com/docselect.aspx?I=68651&E=70267&DOC=DOWTDS&DS=123&DK=STD&DC=en.*

(Continued)

*Primary Examiner* — Peter Y Choi
*Assistant Examiner* — Christine Rea

(57) ABSTRACT

The invention provides a coated substrate comprising at least the following: i) a first layer formed from a first composition that has a melting point, Tm1, and comprising at least one ethylene-based interpolymer; ii) a second layer formed from a second composition comprising the following: a) at least one propylene-based polymer, and b) at least one ethylene-based polymer, and iii) a woven web formed from at least one olefin-based polymer with a melting point of Tm2a and/a or nonwoven web formed from at least one olefin-based polymer with a melting point of Tm2b; and wherein and Tm1 is less than, or equal to, "Tm2a −20° C.", and/or less than, or equal to, "Tm2b −20° C." The invention also provides a coated substrate comprising at least the following: i) a first layer is formed from a first composition that has a melting point, Tm1; and ii) a woven web formed from at least one olefin-based polymer with a melting point of Tm2a and/or a nonwoven web formed from at least one olefin-based polymer with a melting point of Tm2b; and wherein and the first composition comprises at least one propylene-based polymer with a MFR from 15 to 35 g/10 min, and wherein Tm1 is less than, or equal to, "Tm2a −20° C.", and/or less than, or equal to, "Tm2b −20° C."

11 Claims, 1 Drawing Sheet

⟶ Inside Bag

Seal Layer    Tie Layer    Woven PP

(51) Int. Cl.
*B32B 27/04* (2006.01)
*B32B 27/12* (2006.01)
*B32B 7/02* (2006.01)

(56) References Cited

U.S. PATENT DOCUMENTS

| | | | |
|---|---|---|---|
| 4,339,507 A | | 7/1982 | Kurtz et al. |
| 4,844,958 A | | 7/1989 | Chapman et al. |
| 5,272,236 A | | 12/1993 | Lai et al. |
| 5,278,272 A | | 1/1994 | Lai et al. |
| 5,360,648 A | * | 11/1994 | Falla et al. ............. 428/35.2 |
| 5,845,995 A | | 12/1998 | Starlinger Huemer et al. |
| 6,387,491 B1 | | 5/2002 | Nagato et al. |
| 6,509,106 B1 | * | 1/2003 | Edwards et al. ............. 428/523 |
| 7,864,290 B2 | | 1/2011 | Baker |
| 2006/0172143 A1 | | 8/2006 | Breese et al. |
| 2006/0194004 A1 | * | 8/2006 | Niemoller et al. ......... 428/32.11 |
| 2006/0204696 A1 | | 9/2006 | Williams et al. |
| 2007/0178784 A1 | | 8/2007 | Jones et al. |
| 2007/0215610 A1 | * | 9/2007 | Su et al. ............. 219/730 |
| 2007/0254176 A1 | * | 11/2007 | Patel et al. ............. 428/519 |
| 2008/0202075 A1 | | 8/2008 | Kronawittleithner et al. |
| 2010/0209024 A1 | | 8/2010 | Fuerst et al. |
| 2010/0291344 A1 | | 11/2010 | Arroyo-Villan et al. |
| 2011/0097564 A1 | | 4/2011 | Arroyo Villan et al. |

FOREIGN PATENT DOCUMENTS

| | | | | |
|---|---|---|---|---|
| WO | WO 2007008753 A1 | * | 1/2007 | ............. B32B 27/32 |
| WO | WO 2008017244 A1 | * | 2/2008 | ............. B32B 27/32 |
| WO | 2008100720 A1 | | 8/2008 | |

OTHER PUBLICATIONS

Ldpe: General properties. In Polymers: A Properties Database. Retrieved from http://www.polymersdatabase.com/entry.do?id=1211&exno=1211&method=view&si=POLY.*

Versify 4200 plastomer: Technical information . (Feb. 19, 2007). DOW Chemical Company. Retrieved from http://catalog.ides.com/docselect.aspx?I=38903&E=92203&DOC=DOWTDS&DS=123&DK=STD&DC=en.*

Versify 3000 plastomer: Technical information . (Feb. 13, 2007). DOW Chemical Company. Retrieved from http://catalog.ides.com/docselectaspx?I=38903&E=92199&DOC=DOWTDS&DS=123&DK=STD&DC=en.*

Raffia grades. TASNEE Marketing. Retrieved from http://www.tasneemarketing.com/Polypropylene_Raffia_Grades.*

Flexomer TM ETS-9078 nt 7. In (2003). Technical Information. DOW Chemical Company. Retrieved from http ://catalog. ides.com/ docse lect. aspx ?1=68651 & E=70267& DOC= DOWT DS& DS= 123& D K=ST D& DC=e n (Date Oct. 10, 2003).*

Ldpe: General properties. In Polymers: A Properties Database. Retrieved from http://www.polymersdatabase.com/entry.do?id= 1211 &exno= 1211 &method=view&si= POLY (Date Nov. 30, 2012).*

Raffia grades. TASNEE Marketing. Retrieved from http://www.tasneemarketing.com/Propylene_Raffia_Grades (Date Nov. 30, 2012).*

PCT/US2010/042319, International Search Report and Written Opinion, Jul. 16, 2010.

PCT/US2010/042319, International Preliminary Report on Patentability, Aug. 24, 2010.

* cited by examiner

Inside Bag → Seal Layer   Tie Layer   Woven PP

COATED SUBSTRATES AND PACKAGES PREPARED THEREFROM

REFERENCE TO RELATED APPLICATIONS

This application claims the benefit of European Patent Application No. EP09382115.5, filed on Jul. 17, 2009, and fully incorporated herein by reference.

BACKGROUND OF INVENTION

The total volume of Heavy Duty Shipping Sacks (HDSS) is distributed among the following three materials: paper, polyethylene and polypropylene woven. The main advantage of bags formed from polypropylene is their superior toughness, as compared to polyethylene bags or paper bags. For this reason, the majority of the polypropylene bags are used for the packaging of heavy consumer goods, such as building and construction materials, fertilizers, and pet foods. In the chemical industry, polyethylene bags are mostly used due to their many advantages, such as good barrier to moisture, good seal ability and good printing quality.

The introduction of form fill and seal systems (FFS) has been a key factor in the conversion from paper to polyethylene bags. In the FFS process, the bag is formed (sealed vertically and sealed at bottom of bag) on the bagging machine from a roll of film, and immediately the formed bag is filled and sealed across the top. Thus, the bagging process had been completely integrated into a high speed filling process.

Polypropylene bags are desirable to use in a FFS process for the packaging of heavy powders and fillers, such as fertilizers and pet foods. However, such bags have inferior sealing properties and barrier properties, as compared to polyethylene bags. Conventional solutions to improve impermeability of woven polypropylene bags involve applying a coating onto a polypropylene substrate. But, problems still remain for the use of polypropylene substrates in FFS processes due to poor sealing performance at required sealing temperatures. For this reason, the current woven polypropylene bags remain restricted to pre-made bags which are sealed by stitches or patches.

U.S. Pat. No. 4,844,958 discloses a circular woven fabric having a woven tubular body with thermoplastic tapes secured thereto, and an extrusion polymeric coating fuse bonded to the tapes and the woven fabric. The extrusion coated circular woven fabric is useful in intermediate bulk containers for carrying particulates. Polypropylenes, polyethylenes, LLDPE, LDPE and blends thereof may be used for the extrusion coating.

U.K. Patent Specification No. 1265755 discloses a laminated web consisting of a woven layer and a continuous thermoplastic coating thereon. The woven layer is made by interweaving tapes, made from a crystalline polyolefin, and the coating contains at least ten percent, by weight, of the same crystalline olefin polymer and at least 40 percent, by weight, of low density polyethylene.

JP2001030446A (abstract) discloses a woven fabric base material consisting of a thermoplastic resin drawn thread that is coat-treated, and laminated with a resin layer comprising a polyethylene resin material, containing an ethylene-α-olefin copolymer that has a density of 0.870-0.920 g/cc, a MFR of 1-100 g/10 min, a maximum peak temperature of a TREF elution curve of 25-85° C., and an amount elution at 90° C. or lower of at least 90 weight percent.

International Publication No. WO 2009/091952 discloses a perforated coated substrate comprising at least the following: i) a first layer, ii) a second layer, and iii) a woven and/or nonwoven web; and wherein the second layer has a lower softening and/or melting temperature, as compared with the respective softening and/or melting temperatures of the first layer, and the respective softening and/or melting temperatures of the web. The layers of the coated substrate have perforations with a common center.

International Publication No. WO 2008/100720 discloses a composition suitable for use in extrusion coating processes to form a heat sealable film. The composition comprises from 50 to 92 percent, by weight, of a propylene based plastomer or elastomer, and from 8 to 50 percent, by weight, of low density polyethylene. The invention also relates to heat sealable seals, and particularly peelable seals made from the compositions.

U.S. Pat. No. 6,387,491 discloses a flap fusion sheet, formed by fusing a flap, continuous in the longitudinal direction, at least at positions other than end portions in the width direction, at one side of a continuous backing sheet. The backing sheet is formed by laminating layers made of a low melting point polyolefin on both sides of a flat yarn cloth made of high melting point polyolefin.

U.S. Publication No. 2007/0254176 discloses an article comprising at least two layers, a first or low crystallinity layer, comprising a low crystallinity polymer, and a second or high crystallinity layer, comprising a high crystallinity polymer. The high crystallinity polymer has a melting point, as determined by Differential Scanning calorimetry (DSC), that is about the same or within less than 25° C. of the melting point of the low crystallinity polymer. The article is elongated at a temperature below the melting point of the low crystallinity polymer, in at least one direction, to an elongation of at least about 50% of its original length or width, to form a pre-stretched article. Preferably, the high crystallinity layer is capable of undergoing plastic deformation upon the elongation.

International Publication No. WO 2009/033196 (abstract) discloses a coated fabric that comprises a fabric from a monoaxially drawn polymer tape, especially polyolefin or polyester tape, preferably polypropylene or polyethylene terephthalate tape. The fabric is coated with a sealing layer, produced of a thermoplastic synthetic with a melting point below the crystallite melting point of the fabric tape material. The coated fabric is especially suitable for hot air, ultrasonic, heated tool, infrared, or laser beam welding techniques.

Additional coated substrates, films, and/or bags are described in U.S. Publication Nos. 2006/0172143 and 2006/0204696, International Publication Nos. WO 2007/05059, WO 2007/008753, WO 2010/002837, U.K. Patent Application No. 2039788A, and Japanese Patent Application No. JP59011250A (abstract).

There remains a need for coated substrates with improved seal strengths for use in FFS processes. There is a further need for such bags that have sufficient strength to hold heavy powders and fillers. These needs have been met by the following invention.

SUMMARY OF INVENTION

The invention provides a coated substrate comprising at least the following:

i) a first layer formed from a first composition that has a melting point, $Tm1$, and comprising at least one ethylene-based interpolymer;

ii) a second layer formed from a second composition comprising the following: a) at least one propylene-based polymer, and b) at least one ethylene-based polymer; and iii) a woven web formed from at least one olefin-based polymer with a melting point of $Tm2a$ and/or a nonwoven web formed from at least one olefin-based polymer with a melting point of Tm2b; and wherein and Tm1 is less than, or equal to, "Tm2a −20° C.", and/or less than, or equal to, "Tm2b −20° C."

The invention also provides a coated substrate comprising at least the following:

i) a first layer is formed from a first composition that has a melting point, Tm1; and ii) a woven web formed from at least one olefin-based polymer with a melting point of Tm2a and/or a nonwoven web formed from at least one olefin-based polymer with a melting point of Tm2b; and wherein the first composition comprises at least one propylene-based polymer with a MFR from 15 to 35 g/10 min, and wherein and Tm1 is less than, or equal to, "Tm2a −20° C.", and/or less than, or equal to, "Tm2b −20° C."

DETAILED DESCRIPTION OF THE INVENTION

Figure 1:
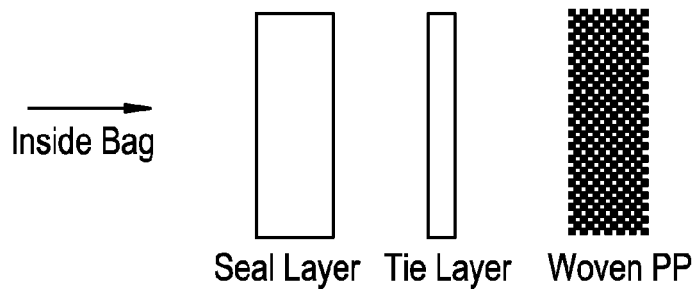
FIG. 1 depicts an example of a coated substrate (seal layer is the first layer, and tie layer is the second layer).

As discussed above, the invention provides a coated substrate comprising at least the following:

i) a first layer formed from a first composition that has a melting point, Tm1, and comprising at least one ethylene-based interpolymer;

ii) a second layer formed from a second composition comprising the following: a) at least one propylene-based polymer, and b) at least one ethylene-based polymer; and iii) a woven web formed from at least one olefin-based polymer with a melting point of Tm2a and/or a nonwoven web formed from at least one olefin-based polymer with a melting point of Tm2b; and wherein and wherein and Tm1 is less than, or equal to, "Tm2a −20° C.", and/or less than, or equal to, "Tm2b −20° C."

In one embodiment, Tm1 is from 70° C. to "Tm2a −20° C.," and/or from 70° C. to "Tm2b −20° C."

In one embodiment, Tm1 is from 80° C. to "Tm2a −20° C.," and/or from 80° C. to "Tm2b −20° C."

In one embodiment, Tm1 is from 90° C. to "Tm2a −20° C.," and/or from 90° C. to "Tm2b −20° C."

In one embodiment, the first composition has as melting temperature (Tm) from 115° C. to 135° C., preferably from 120° C. to 130° C.

In one embodiment, the first composition has a melt index (I2) from 3 to 20 g/10 min, preferably from 4 to 15 g/10 min, more preferably 5 to 12 g/10 min.

In one embodiment, the first composition has a density from 0.905 to 0.930 g/cc, preferably from 0.910 to 0.930 g/cc, more preferably from 0.915 to 0.925 g/cc (1 cc=1 cm$^3$).

In one embodiment, the at least one ethylene-based interpolymer is a heterogeneously branched ethylene/α-olefin interpolymer or a homogeneously branched ethylene/α-olefin interpolymer. In a further embodiment, the α-olefin is selected from 1-octene, 1-hexene, 1-butene or propylene.

In one embodiment, the at least one ethylene-based interpolymer is a heterogeneously branched ethylene/α-olefin interpolymer. In a further embodiment, the α-olefin is selected from 1-octene, 1-hexene, 1-butene or propylene.

In one embodiment, the at least one ethylene-based interpolymer is a homogeneously branched ethylene/α-olefin interpolymer. In a further embodiment, the homogeneously branched ethylene/α-olefin interpolymer is a homogeneously branched substantially linear ethylene/α-olefin interpolymer. In a further embodiment, the α-olefin is selected from 1-octene, 1-hexene, 1-butene or propylene. In another embodiment, the homogeneously branched ethylene/α-olefin interpolymer is a homogeneously branched linear ethylene/α-olefin interpolymer. In a further embodiment, the α-olefin is selected from 1-octene, 1-hexene, 1-butene or propylene.

In one embodiment, the first composition comprises a heterogeneously branched ethylene/α-olefin interpolymer and a homogeneously branched ethylene/α-olefin interpolymer. In a further embodiment, the α-olefin is selected from 1-octene, 1-hexene, 1-butene or propylene. In a further embodiment, the homogeneously branched ethylene/α-olefin interpolymer is a homogeneously branched substantially linear ethylene/α-olefin interpolymer. In another embodiment, the homogeneously branched ethylene/α-olefin interpolymer is a homogeneously branched linear ethylene/α-olefin interpolymer.

In one embodiment, the first composition comprises greater than 50 weight percent, preferably greater than 60 weight percent, more preferably greater than 70 weight percent, of a sum weight of a heterogeneously branched ethylene/α-olefin interpolymer and a homogeneously branched ethylene/α-olefin interpolymer, based on the weight of the first composition. In a further embodiment, the α-olefin is selected from 1-octene, 1-hexene, 1-butene or propylene.

In one embodiment, the first composition comprises from 50 to 100 weight percent, preferably from 60 to 95 weight percent, more preferably from 70 to 90 weight percent, of a sum weight of a heterogeneously branched ethylene/α-olefin interpolymer and a homogeneously branched ethylene/α-olefin interpolymer, based on the weight of the first composition. In a further embodiment, the α-olefin is selected from 1-octene, 1-hexene, 1-butene or propylene.

In one embodiment, the first composition further comprises a low density polyethylene. In a further embodiment, the low density polyethylene is present in an amount from 5 to 40 weight percent, preferably from 10 to 30 weight percent, based on the weight of the first composition. In another embodiment, the low density polyethylene is present in an amount less than 40 weight percent, preferably less than 30 weight percent, based on the weight of the first composition.

In one embodiment, the second composition has a melt flow rate (MFR) from 10 to 35 g/10 min, preferably from 12 to 30 g/10 min, more preferably from 15 to 25 g/10 min.

In one embodiment, the second composition has a melt index (I2) from 3 to 20 g/10 min, preferably from 4 to 15 g/10 min, more preferably from 5 to 12 g/10 min.

In one embodiment, the second composition has a density from 0.860 to 0.930 g/cc, preferably from 0.865 to 0.925 g/cc, and more preferably from 0.870 to 0.920 g/cc.

In one embodiment, the second composition has a melting point (Tm) from 90° C. to 120° C., preferably from 100° C. to 110° C. The melting point (Tm) is the highest polymer (or blend) melting point as determined by DSC.

In one embodiment, the propylene-based polymer of the second composition has a density from 0.860 g/cc to 0.900 g/cc, preferably from 0.870 g/cc to 0.890 g/cc, more preferably from 0.875 g/cc to 0.885 g/cc. In a further embodiment, the propylene-based polymer is a propylene/ethylene interpolymer. In another embodiment, the propylene-based polymer is a propylene/α-olefin interpolymer.

In one embodiment, the propylene-based polymer of the second composition has a melt flow rate (MFR) from 5 to 50 g/10 min, preferably from 10 to 35 g/10 min, more preferably from 15 to 30 g/10 min, and more preferably from 20 to 30 g/10 min. In a further embodiment, the propylene-based polymer is a propylene/ethylene interpolymer. In another embodiment, the propylene-based polymer is a propylene/α-olefin interpolymer.

In one embodiment, the propylene-based polymer of the second composition has a molecular weight distribution from 1.5 to 6, preferably from 2 to 5.5, more preferably from 2 to 5, as determined by GPC. In a further embodiment, the propylene-based polymer is a propylene/ethylene interpolymer. In another embodiment, the propylene-based polymer is a propylene/α-olefin interpolymer.

In one embodiment, the propylene-based polymer of the second composition is present in an amount from 50 to 92 weight percent, preferably from 55 to 90 weight percent, more preferably from 60 to 85 weight percent, and even more preferably from 60 to 80 weight percent, based on the weight of the second composition. In a further embodiment, the propylene-based polymer is a propylene/ethylene interpolymer. In another embodiment, the propylene-based polymer is a propylene/α-olefin interpolymer.

In one embodiment, the ethylene-based polymer of the second composition is a low density polyethylene. In a further embodiment, the low density polyethylene has a melt index (I2) from 0.2 to 15 g/10 min, preferably from 0.3 to 8 g/10 min, more preferably from 0.4 to 4 g/10 min. In one embodiment, the low density polyethylene has a molecular weight distribution from 5 to 13, preferably from 6 to 12, more preferably from 7 to 10, as determined by GPC. In one embodiment, the low density polyethylene has a density from 0.900 to 0.930 g/cc, preferably from 0.910 to 0.925 g/cc, more preferably from 0.915 to 0.922 g/cc. In one embodiment, the low density polyethylene is present in an amount from 8 to 50 weight percent, preferably from 10 to 45 weight percent, more preferably from 20 to 40 weight percent, based on the weight of the second composition. The low density polyethylene may have a combination of two or more of the above embodiments.

In one embodiment, the first layer is present in an amount from 15 to 55 weight percent, preferably from 23 to 50 weight percent; the second layer is present in an amount from 2 to 10 weight percent, from 5 to 7 weight percent; and the web is present in an amount from 35 to 75 weight percent, preferably from 42 to 70 weight percent; each weight percent based on the weight of the coated substrate.

In one embodiment, the coating weight of the first layer is less than, or equal to, 45 g/m2, preferably less than, or equal to, 40 g/m2, more preferably less than, or equal to, 35 g/m2.

In one embodiment, the ratio of "the coating weight of the first layer" to "the coating weight of the second layer" is greater than 2, preferably greater than 3, more preferably greater than 4.

In one embodiment, the ratio of "the coating weight of the first layer" to "the coating weight of the second layer" is greater than 5, preferably greater than 6, more preferably greater than 6.5.

In one embodiment, the ratio of "the coating weight of the first layer" to "the coating weight of the second layer" is from 2 to 7, preferably from 3 to 7, more preferably from 4 to 7.

In one embodiment, the ratio of "the coating weight of the first layer" to "the coating weight of the second layer" is greater than 0.1, preferably greater than 0.5, more preferably greater than 1.

In one embodiment, the ratio of "the thickness of the first layer" to "the thickness of the second layer" is greater than 2, preferably greater than 3, more preferably greater than 4.

In one embodiment, the ratio of "the thickness of the first layer" to "the thickness of the second layer" is greater than 5, preferably greater than 6, more preferably greater than 6.5.

In one embodiment, the ratio of "the thickness of the first layer" to "the thickness of the second layer" is from 2 to 7, preferably from 3 to 7, more preferably from 4 to 7.

In a preferred embodiment, the second layer is located between the first layer and the web. In a further embodiment, the first layer is adjacent to the second layer, and the second layer is adjacent to the web.

In one embodiment, the first layer does not comprise a propylene-based polymer.

In a preferred embodiment, the composition of the first layer is not the same as the composition of the second layer.

In one embodiment, the composition used to form the first layer comprises two ethylene-based polymers.

In one embodiment, the coated substrate consists of the first layer, the second layer and the web.

In a preferred embodiment, the web is coated only on one side.

In one embodiment, the Tm of the second layer is lower than the Tm of the first layer.

In a preferred embodiment, the coated substrate is not elongated.

In one embodiment, the first layer is not adjacent to the web.

In one embodiment, the first layer is a sealant layer.

In one embodiment, the second layer is a tie layer.

In one embodiment, the first composition comprises at least one additive. In a further embodiment, the additive is selected from UV stabilizers, antioxidants, slip agent, fillers, and combinations thereof.

In one embodiment, the second composition comprises at least one additive. In a further embodiment, the additive is selected from UV stabilizers, antioxidants, slip agent, fillers, and combinations thereof.

In one embodiment, the second layer is adjacent to the woven and/or nonwoven web, and the first layer is an exterior layer.

In one embodiment, the coated substrate comprises at least three layers, including the woven and/or nonwoven web.

In one embodiment, the coated substrate comprises at least four layers, including the woven and/or nonwoven web.

The invention also provides a coated substrate comprising at least the following:

i) a layer is formed from a composition that has a melting point, Tm1; and ii) a woven web formed from at least one olefin-based polymer with a melting point of Tm2a and/or a nonwoven web formed from at least one olefin-based polymer with a melting point of Tm2b; and wherein and the composition comprises at least one propylene-based polymer with a MFR from 15 to 35 g/10 min, and wherein Tm1 is less than, or equal to, "Tm2a −20° C.", and/or less than, or equal to, "Tm2b −20° C."

In one embodiment, the composition comprises at least one additive. In a further embodiment, the additive is selected from UV stabilizers, antioxidants, slip agent, fillers, and combinations thereof.

In one embodiment, Tm1 is from 70° C. to "Tm2a −20° C.", and/or from 70° C. to "Tm2b −20° C."

In one embodiment, Tm1 is from 80° C. to "Tm2a −20° C.", and/or from 80° C. to "Tm2b −20° C."

In one embodiment, Tm1 is from 90° C. to "Tm2a −20° C.", and/or from 90° C. to "Tm2b −20° C."

In one embodiment, the composition has as melting temperature (Tm) from 115° C. to 135° C., preferably from 120° C. to 130° C.

In one embodiment, the composition has a melt flow rate (MFR) from 10 to 35 g/10 min, preferably from 12 to 30 g/10 min, more preferably from 15 to 25 g/10 min.

In one embodiment, the composition has a density from 0.860 to 0.930 g/cc, preferably from 0.865 to 0.925 g/cc, and more preferably from 0.870 to 0.920 g/cc.

In one embodiment, the composition has a melting point (Tm) from 90° C. to 120° C., preferably from 100° C. to 110° C. The melting point (Tm) is the highest polymer (or blend) melting point as determined by DSC.

In one embodiment, the propylene-based polymer has a density from 0.860 g/cc to 0.900 g/cc, preferably from 0.870 g/cc to 0.890 g/cc, more preferably from 0.875 g/cc to 0.885 g/cc. In a further embodiment, the propylene-based polymer is a propylene/ethylene interpolymer. In another embodiment, the propylene-based polymer is a propylene/α-olefin interpolymer.

In one embodiment, the propylene-based polymer has a melt flow rate (MFR) from 15 to 35 g/10 min, more preferably from 15 to 30 g/10 min, and more preferably from 20 to 30 g/10 min. In a further embodiment, the propylene-based polymer is a propylene/ethylene interpolymer. In another embodiment, the propylene-based polymer is a propylene/α-olefin interpolymer.

In one embodiment, the propylene-based polymer has a molecular weight distribution from 1.5 to 6, preferably from 2 to 5.5, more preferably from 2 to 5, as determined by GPC. In a further embodiment, the propylene-based polymer is a propylene/ethylene interpolymer. In another embodiment, the propylene-based polymer is a propylene/α-olefin interpolymer.

In one embodiment, the propylene-based polymer is present in an amount from 50 to 92 weight percent, preferably from 55 to 90 weight percent, more preferably from 60 to 85 weight percent, and even more preferably from 60 to 80 weight percent, based on the weight of the composition. In a further embodiment, the propylene-based polymer is a propylene/ethylene interpolymer. In another embodiment, the propylene-based polymer is a propylene/α-olefin interpolymer.

In one embodiment, the composition further comprises an ethylene-based polymer. In a further embodiment, the ethylene-based polymer is a low density polyethylene. In a further embodiment, the low density polyethylene has a melt index (I2) from 0.2 to 15 g/10 min, preferably from 0.3 to 8 g/10 min, more preferably from 0.4 to 4 g/10 min. In one embodiment, the low density polyethylene has a molecular weight distribution from 5 to 13, preferably from 6 to 12, more preferably from 7 to 10, as determined by GPC. In one embodiment, the low density polyethylene has a density from 0.900 to 0.930 g/cc, preferably from 0.910 to 0.925 g/cc, more preferably from 0.915 to 0.922 g/cc. In one embodiment, the low density polyethylene is present in an amount from 8 to 50 weight percent, preferably from 10 to 45 weight percent, more preferably from 20 to 40 weight percent, based on the weight of the composition. The low density polyethylene may have a combination of two or more of the above embodiments.

In one embodiment, the coating weight of the layer is less than, or equal to, 45 g/m2, preferably less than, or equal to, 40 g/m2, more preferably less than, or equal to, 35 g/m2.

In one embodiment, the coated substrate consists of the layer and the web.

In a preferred embodiment, the web is coated only on one side.

In a preferred embodiment, the coated substrate is not elongated.

The following embodiments apply to any coated substrate described herein.

In one embodiment, the web is formed from a composition comprising at least one propylene-based polymer. In a further embodiment, the web has a Tm2a or Tm2b greater than, or equal to, 140° C. In a further embodiment, the propylene-based polymer is a propylene homopolymer.

In one embodiment, the web is a woven web with a Tm2a from 140° C. to 150° C. In a further embodiment, the web is formed from a composition comprising at least one propylene-based polymer. In a further embodiment, the propylene-based polymer is a propylene homopolymer.

In one embodiment, the web is formed from a composition comprising at least one ethylene-based polymer.

In one embodiment, the web is a woven web, and Tm1 is less than, or equal to, "Tm2a −20° C." In a further embodiment, the web is formed from a composition comprising at least one propylene-based polymer. In a further embodiment, the propylene-based polymer is a propylene homopolymer.

In one embodiment, the web is a woven web, and Tm1 is from 70° C. to "Tm2a −20° C." In a further embodiment, the web is formed from a composition comprising at least one propylene-based polymer. In a further embodiment, the propylene-based polymer is a propylene homopolymer.

In one embodiment, the web is a nonwoven web, and Tm1 is less than, or equal to, "Tm2b −20° C." In a further embodiment, the web is formed from a composition comprising at least one propylene-based polymer. In a further embodiment, the propylene-based polymer is a propylene homopolymer.

In one embodiment, the web is a nonwoven web, and Tm1 is from 70° C. to "Tma2b−20° C." In a further embodiment, the web is formed from a composition comprising at least one propylene-based polymer. In a further embodiment, the propylene-based polymer is a propylene homopolymer.

In one embodiment, the coated substrate has seal strength greater than 15 N/15 mm, preferably greater than 20 N/15 mm, more preferably greater than 25 N/15 mm, at a sealing temperature of 130° C.

In one embodiment, the coated substrate has a seal strength greater than, or equal to, 25 N/15 mm, preferably greater than, or equal to, 26 N/15 mm, more preferably greater than, or equal to, 27 N/15 mm, at a sealing temperature of 130° C.

In a preferred embodiment, the coated substrate does not contain a polar polymer, such as a polyamide, a polyester, an ethylene vinyl alcohol, a polyurethane, or a polylactic acid.

In a preferred embodiment, the coated substrate does not contain an acrylate, such as ethylene methylacrylate copolymer, ethylene ethylacrylate copolymer, or ethylene butylacrylate copolymer.

In a preferred embodiment, the coated substrate does not contain ethylene vinyl acetate copolymer, ethylene acrylic acid copolymer, or ethylene methacrylic copolymer.

In a preferred embodiment, the coated substrate does not contain an ionomer, such as one or more SURLYN ionomers available from DuPont.

In a preferred embodiment, the coated substrate does not contain a polyvinylchloride (PVC) or a vinylidene chloride copolymer (PVDC).

In a preferred embodiment, the coated substrate does not contain a grafted ethylene-based polymer, for example, a maleic anhydride grafted ethylene-based polymer, and does not contain a grafted propylene-based polymer, for example, a maleic anhydride grafted propylene-based polymer.

In a preferred embodiment, the coated substrate does not contain an olefin/vinyl aromatic copolymer.

The invention also provides an article comprising at least one component formed from an inventive coated substrate.

A coated substrate may comprise a combination of two or more embodiments as described herein.

The first composition may comprise a combination of two or more embodiments as described herein.

The second composition may comprise a combination of two or more embodiments as described herein.

An ethylene-based polymer may comprise a combination of two or more embodiments as described herein.

An ethylene-based interpolymer may comprise a combination of two or more embodiments as described herein.

A propylene-based polymer may comprise a combination of two or more embodiments as described herein.

A propylene-based interpolymer may comprise a combination of two or more embodiments as described herein.

A polymer layer may comprise a combination of two or more embodiments as described herein.

A woven web may comprise a combination of two or more embodiments as described herein.

A nonwoven web may comprise a combination of two or more embodiments as described herein.

Ethylene-Based Polymers

Suitable ethylene-base polymers for use in the coated substrates of the invention include, but are not limited to, heterogeneously branched linear ethylene-based polymers, homogeneously branched linear ethylene-based polymers, and homogeneously branched substantially linear ethylene polymers (that is homogeneously branched long chain branched ethylene polymers), or combinations thereof.

The heterogeneously branched linear ethylene interpolymers, homogeneously branched linear ethylene interpolymers, or homogeneously branched substantially linear ethylene interpolymers, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the C3-C20 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene. Preferred copolymers include EP (ethylene/propylene), EB (ethylene/butene), EH (ethylene/hexane) and EO (ethylene/octene) copolymers.

Typically the low density polyethylene (LDPE) is made under high-pressure, using free-radical polymerization conditions. Low density polyethylene is a homopolymer, and typically has a density from 0.91 to 0.94 g/cc, preferably from 0.90 to 0.93 g/cc.

In one embodiment, an ethylene-based polymer has a melt index, I2, less than, or equal to, 20 g/10 min, preferably less than, or equal to, 15 g/10 min, more preferably less than, or equal to, 8 g/10 min, most preferably less than, or equal to, 4 g/10 min, as measured in accordance with ASTM 1238, Condition 190° C./2.16 kg.

Heterogeneously branched linear ethylene interpolymers include, but are not limited to, interpolymers of ethylene and one or more $C_3$ to $C_8$ α-olefins. Heterogeneously branched ethylene interpolymers can be prepared using Ziegler-Natta catalyst systems. Both the molecular weight distribution, and the short chain branching distribution, each arising from α-olefin (or comonomer) copolymerization, are relatively broad, compared to homogeneously branched linear and homogeneously branched substantially linear ethylene interpolymers. Heterogeneously branched linear ethylene interpolymers can be made in a solution, slurry, or gas phase process using a Ziegler-Natta catalyst. For example, see U.S. Pat. No. 4,339,507, which is fully incorporated herein by reference.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). These linear interpolymers lack long chain branching, or measurable amounts of long chain branching, as discussed above.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX polymers, ATTANE polymer, TUFLIN polymers, and FLEXOMER polymers (all from The DOW Chemical Company), and ESCORENE LLDPE polymers (from Exxon Mobil).

In one embodiment, the heterogeneously branched linear ethylene interpolymer has a molecular weight distribution (Mw/Mn) less than, or equal to, 5, preferably less than, or equal to, 4, and more preferably less than, or equal to, 3.5. In another embodiment, this ethylene-based polymer has a molecular weight distribution from 1.1 to 5, and preferably from about 1.2 to 4, and more preferably from 1.5 to 3.5. In a further embodiment, the interpolymer is an the ethylene/α-olefin interpolymer. In a further embodiment, the α-olefin is selected from 1-octene, 1-hexene, 1-butene, or propylene.

In one embodiment, the heterogeneously branched linear ethylene interpolymer has a melt index (I2) from 0.1 g/10 min to 100 g/10 min, preferably from 0.5 g/10 min to 50 g/10 min, and more preferably from 1 g/10 min to 20 g/10 min, as determined using ASTM D-1238 (190° C., 2.16 kg load). In a further embodiment, the interpolymer is an ethylene/α-olefin interpolymer. In a further embodiment, the α-olefin is selected from 1-octene, 1-hexene, 1-butene, or propylene.

In one embodiment, the heterogeneously branched linear ethylene interpolymer has a density less than, or equal to, 0.94 g/cc, preferably less than, or equal to, 0.93 g/cc, and more preferably less than, or equal to, 0.92 g/cc. In another embodiment, this ethylene-based polymer has a density greater than, or equal to, 0.86 g/cc, preferably greater than, or equal to, 0.87 g/cc, and more preferably greater than, or equal to, 0.88 g/cc. In a further embodiment, the interpolymer is an the ethylene/α-olefin interpolymer. In a further embodiment, the α-olefin is selected from 1-octene, 1-hexene, 1-butene, or propylene.

A heterogeneously branched linear ethylene interpolymer may comprise a combination of two or more embodiments as described herein.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same ethylene-to-comonomer ratio. The homogeneously branched ethylene interpolymers include linear ethylene interpolymers, and substantially linear ethylene interpolymers.

The homogeneously branched linear ethylene interpolymers are ethylene polymers, which lack long chain branching (or measurable amounts of long chain branching), but do have short chain branches, derived from the comonomer polymerized into the interpolymer, and which comonomer is homogeneously distributed, both within the same polymer chain, and between different polymer chains. That is, homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers supplied by the Mitsui Chemical Company and EXACT polymers supplied by ExxonMobil Chemical Company.

In one embodiment, the homogeneously branched linear ethylene interpolymer has a molecular weight distribution (Mw/Mn) less than, or equal to, 5, preferably less than, or equal to, 4, and more preferably less than, or equal to, 3.5. In another embodiment, this ethylene-based polymer has a molecular weight distribution from 1.1 to 5, and preferably from about 1.2 to 4, and more preferably from 1.5 to 3.5. In a further embodiment, the interpolymer is an the ethylene/α-olefin interpolymer. In a further embodiment, the α-olefin is selected from 1-octene, 1-hexene, 1-butene, or propylene.

In one embodiment, the homogeneously branched linear ethylene interpolymer has a melt index (I2) from 0.1 g/10 min to 100 g/10 min, preferably from 0.5 g/10 min to 50 g/10 min, and more preferably from 1 g/10 min to 20 g/10 min, as determined using ASTM D-1238 (190° C., 2.16 kg load). In a further embodiment, the interpolymer is an ethylene/α-olefin interpolymer. In a further embodiment, the α-olefin is selected from 1-octene, 1-hexene, 1-butene, or propylene.

In one embodiment, the homogeneously branched linear ethylene interpolymer has a density less than, or equal to, 0.94 g/cc, preferably less than, or equal to, 0.93 g/cc, and more preferably less than, or equal to, 0.92 g/cc. In another embodiment, this ethylene-based polymer has a density greater than, or equal to, 0.86 g/cc, preferably greater than, or equal to, 0.87 g/cc, and more preferably greater than, or equal to, 0.88 g/cc. In a further embodiment, the interpolymer is an the ethylene/α-olefin interpolymer. In a further embodiment, the α-olefin is selected from 1-octene, 1-hexene, 1-butene, or propylene.

A homogeneously branched linear ethylene interpolymer may comprise a combination of two or more embodiments as described herein.

The homogeneously branched substantially linear ethylene interpolymers are described in U.S. Pat. Nos. 5,272,236; 5,278,272; 6,054,544; 6,335,410 and 6,723,810; the entire contents of each are herein incorporated by reference. The substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. The length of a long chain branch is longer than the carbon length of a short chain branch formed from the incorporation of one comonomer into the polymer backbone. Commercial examples of substantially linear polymers include the ENGAGE polymers and AFFINITY polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

In one embodiment, the homogeneously branched substantially linear ethylene interpolymer has a molecular weight distribution (Mw/Mn) less than, or equal to, 5, preferably less than, or equal to, 4, and more preferably less than, or equal to, 3.5. In another embodiment, this ethylene-based polymer has a molecular weight distribution from 1.1 to 5, and preferably from about 1.2 to 4, and more preferably from 1.5 to 3.5. In a further embodiment, the interpolymer is an the ethylene/α-olefin interpolymer. In a further embodiment, the α-olefin is selected from 1-octene, 1-hexene, 1-butene, or propylene.

In one embodiment, the homogeneously branched substantially linear ethylene interpolymer has a melt index (I2) from 0.1 g/10 min to 100 g/10 min, preferably from 0.5 g/10 min to 50 g/10 min, and more preferably from 1 g/10 min to 20 g/10 min, as determined using ASTM D-1238 (190° C., 2.16 kg load). In a further embodiment, the interpolymer is an ethylene/α-olefin interpolymer. In a further embodiment, the α-olefin is selected from 1-octene, 1-hexene, 1-butene, or propylene.

In one embodiment, the homogeneously branched substantially linear ethylene interpolymer has a density less than, or equal to, 0.94 g/cc, preferably less than, or equal to, 0.93 g/cc, and more preferably less than, or equal to, 0.92 g/cc. In another embodiment, this ethylene-based polymer has a density greater than, or equal to, 0.86 g/cc, preferably greater than, or equal to, 0.87 g/cc, and more preferably greater than, or equal to, 0.88 g/cc. In a further embodiment, the interpolymer is an the ethylene/α-olefin interpolymer. In a further embodiment, the α-olefin is selected from 1-octene, 1-hexene, 1-butene, or propylene.

A homogeneously branched substantially linear ethylene interpolymer may comprise a combination of two or more embodiments as described herein.

Mixtures or blends of a heterogeneously branched interpolymers and homogeneously branched interpolymers may also be used.

Propylene-Based Polymer

The propylene-based polymers suitable for use in the coated substrates of the invention, include, but are not limited to, propylene/ethylene copolymers, propylene/ethylene/1-butene interpolymers, propylene/ethylene/ENB interpolymers, propylene/ethylene/1-hexene interpolymers, and propylene/ethylene/1-octene interpolymers. In a preferred embodiment, the propylene-based polymer is a propylene-based interpolymer.

Suitable propylene-base interpolymers include VERSIFY polymers (available from The Dow Chemical Company). Additional propylene-based polymers include VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (Degussa). Other suitable polymers include ADSYL polymers, ADFLEX polymers, BORSOFT polymers, and various blends, such as blends of polypropylene homopolymers and propylene/α-olefin interpolymers.

In one embodiment, the propylene-based polymer has a melt flow rate (MFR) greater than, or equal to, 5, preferably greater than, or equal to 10, more preferably greater than, or equal to 15 g/10 min. In another embodiment, the propylene-based polymer has a melt flow rate (MFR) less than, or equal to, 50, preferably less than, or equal to, 40, more preferably less than, or equal to, 35 g/10 min. The MFR is measured according to ASTM D-1238 (2.16 kg, 230° C.). In one embodiment, the propylene-based polymer is a propylene/ethylene interpolymer, preferably a propylene/ethylene copolymer. In another embodiment, the propylene-based polymer is a propylene/α-olefin interpolymer.

In one embodiment, the propylene-based polymer has a density less than, or equal to, 0.90 g/cc, preferably less than, or equal to, 0.89 g/cc, and more preferably less than, or equal to, 0.88 g/cc (cc=cubic centimeter=$cm^3$). In another embodiment, the propylene-based polymer has a density greater than, or equal to, 0.85 g/cc, preferably greater than, or equal to, 0.86 g/cc, and more preferably greater than, or equal to, 0.87 g/cc. In one embodiment, the propylene-based polymer is a propylene/ethylene interpolymer, and preferably a propylene/ethylene copolymer. In another embodiment, the propylene-based polymer is a propylene/α-olefin interpolymer.

In one embodiment, the propylene-based polymer has a molecular weight distribution (Mw/Mn) less than, or equal to, 6, and preferably less than, or equal to, 5.5, and more preferably less than, or equal to 5. In another embodiment, the molecular weight distribution is greater than, or equal to, 2, preferably greater than, or equal to, 2.5, more preferably greater than, or equal to 3. In one embodiment, the propylene-based polymer is a propylene/ethylene interpolymer, and preferably a propylene/ethylene copolymer. In another embodiment, the propylene-based polymer is a propylene/α-olefin interpolymer.

In one embodiment, the propylene-based polymer has a molecular weight distribution (Mw/Mn) from 1.5 to 6, and more preferably from 2.5 to 5.5, and more preferably from 3 to 5. All individual values and subranges from 1.5 to 6 are included herein and disclosed herein. In one embodiment, the propylene-based polymer is a propylene/ethylene interpolymer, and preferably a propylene/ethylene copolymer. In another embodiment, the propylene-based polymer is a propylene/α-olefin interpolymer.

In one embodiment, propylene-based polymer comprises propylene and one or more unsaturated comonomers. Unsaturated comonomers include, but are not limited to, C4-C20 α-olefins, especially C4-C12 α-olefins, such as 1-butene, 1-pentene, 1-hexene, 4-methyl-1-pentene, 1-heptene, 1-octene, 1-decene, 1-dodecene and the like; C4-C20 diolefins, preferably 1,3-butadiene, 1,3-pentadiene, norbornadiene, 5-ethylidene-2-norbornene (ENB) and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In one embodiment, propylene-based polymers comprise propylene, and typically, ethylene, and/or one or more unsaturated comonomers. Such polymers are characterized as having at least one, preferably more than one, of the following properties: (i) 13C NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same, and a $T_{Max}$ that decreases as the amount of comonomer (i.e., units derived from ethylene and/or the unsaturated comonomer(s)) in the interpolymer is increased, and (iv) an X-ray diffraction pattern that reports more gamma-form crystals than a comparable interpolymer prepared with a Ziegler-Natta catalyst. Preferably the propylene-based interpolymer is a propylene/ethylene interpolymer, and preferably a propylene/ethylene copolymer. Especially preferred propylene-based polymers are the VERSIFY polymers available from The Dow Chemical Company. It is noted that in property (i) the distance between the two 13C NMR peaks is about 1.1 ppm. These propylene-based interpolymers are made using a nonmetallocene, metal-centered, heteroaryl ligand catalyst. These polymers can be blended with other polymers. Typically such interpolymers are characterized by at least one, preferably at least two, more preferably at least three, and even more preferably all four, of these properties. The preparation of such interpolymers are described in U.S. Pat. No. 6,919,407, column 16, line 6 to column 45, line 43, incorporated herein by reference.

With respect to the X-ray property of subparagraph (iv) above, a "comparable" interpolymer is one having the same monomer composition within 10 weight percent, and the same $M_w$ (weight average molecular weight) within 10 weight percent. For example, if an inventive propylene/ethylene/1-hexene interpolymer is 9 weight percent ethylene and 1 weight percent 1-hexene, and has a Mw of 250,000, then a comparable polymer would have from 8.1 to 9.9 weight percent ethylene, from 0.9 to 1.1 weight percent 1-hexene, and a Mw from 225,000 to 275,000, and prepared with a Ziegler-Natta catalyst.

In one embodiment, a propylene-based polymer is a propylene-based interpolymer that is characterized as having substantially isotactic propylene sequences. "Substantially isotactic propylene sequences," and similar terms, mean that the sequences have an isotactic triad (mm), measured by 13C NMR, of greater than about 0.85, preferably greater than about 0.90, more preferably greater than about 0.92, and most preferably greater than about 0.93. Isotactic triads are well known in the art, and are described in, for example, U.S. Pat. No. 5,504,172, and International Publication No. WO 00/01745, which refers to the isotactic sequence in terms of a triad unit in the copolymer molecular chain, determined by 13C NMR spectra.

In one embodiment, the propylene-based polymer is a propylene-based interpolymer that comprises: (A) at least 60 weight percent (wt %) units derived from propylene, and (B) from greater than zero to 40 weight percent units derived from ethylene; the propylene interpolymer further characterized by at least one of the following properties: (1) a g' ratio of less than 1, preferably less than 0.95, more preferably less than 0.85 and even more preferably less than 0.80, measured at interpolymer number average molecular weight (Mn), (2) a relative compositional drift of less than 50%, and (3) propylene chain segments having a chain isotacticity triad index of at least 70 mole percent. In another embodiment, the isotactic propylene interpolymer is characterized by at least two of properties (1), (2) and (3) and in another embodiment, the isotactic propylene interpolymer is characterized by properties (1), (2) and (3).

In one embodiment, the propylene-based interpolymer is a propylene-based interpolymer that is characterized by at least one of the following: (4) an intrinsic viscosity is less than 0.35 at a $\log_{10}$ weight average molecular weight of 5.5, and (5) a degree of strain hardening of between greater than 1.2 and 20. In one embodiment, the isotactic propylene interpolymer is characterized by both (4) and (5).

In one embodiment, the propylene-based interpolymer is further characterized by at least one of the following properties:
  (a) A weight average molecular weight (Mw) of at least 50,000 grams per mole (g/mol);
  (b) An Mw/Mn of less than 4;
  (c) A critical shear rate at the onset of surface melt fracture (OSMF) of at least 4,000 sec$^{-1}$;
  (e) An $I_{10}/I_2$ at 230° C. greater than or equal to ($\geq$) 5.63;
  (f) A nominal weight percent crystallinity from greater than 0 to 40 wt %; and, preferably,
  (g) A single melting point as measured by differential scanning calorimetry (DSC).

A propylene-based interpolymer may be prepared by polymerizing propylene and at least one of ethylene and a $C_{4-30}$ α-olefin under continuous solution polymerization conditions, in the presence of a catalyst composition comprising a hafnium complex of a polyvalent aryloxyether. The catalyst includes an activating cocatalyst, and the polymerization conditions typically include a temperature from 120 to 250° C. and a pressure from 100 kPa to 300 MPa. These propylene-based interpolymers are further described in U.S. Provisional Application No. 60/988,999, filed on Nov. 19, 2007, and fully incorporated herein by reference (now International Application No. PCT/US08/082599, filed on Nov. 6, 2008, published as WO 2009/067337, fully incorporated herein by reference).

A propylene-based polymer may comprise a combination of two or more embodiments as described herein.

A propylene-based interpolymer may comprise a combination of two or more embodiments as described herein.

A propylene/ethylene interpolymer may comprise a combination of two or more embodiments as described herein.

A propylene/ethylene copolymer may comprise a combination of two or more embodiments as described herein.

A propylene/α-olefin interpolymer may comprise a combination of two or more embodiments as described herein.

A propylene/α-olefin copolymer may comprise a combination of two or more embodiments as described herein.

Webs

Suitable webs for use in the coated substrates of the invention include woven webs, nonwoven webs, and combinations thereof.

In one embodiment, the web is formed from a composition comprising a propylene-based polymer. In a further embodiment, the propylene-based polymer is a polypropylene homopolymer.

In one embodiment, the web is formed from a composition comprising a ethylene-based polymer. In a further embodiment, the ethylene-based polymer is a polyethylene homopolymer.

In one embodiment, the web has a thickness of 5 microns or more.

In one embodiment, the web has a weight from 50 to 500 g/m$^2$, preferably from 50 to 250 g/m$^2$.

Examples of woven webs and/or nonwoven webs are described in U.S. Pat. No. 5,845,995; U.S. Publication No. 2007/0178784; and German Application DE 3236770A1; each reference is incorporated herein by reference.

Suitable webs are available from Ciplas S.A. and Acorn Planting Products Ltd.

A web may comprise a combination of two or more embodiments as described herein.

Process for Forming the Coated Substrates of the Invention

Coated substrate configurations may be formed using an extrusion coating process, by either co-extrusion, requiring polymers selection in accordance to coextrusion technique used, or by an extrusion lamination process, which permits a combination of web based materials, and a single or multi-layered molten extrusion coating, to form a laminate composed of a substrate web and a laminated coating.

The integrity of the coating is largely a matter of bonding the layers together. Extrusion coating and extrusion lamination processes may use corona treatment, flame treatment, or plasma treatment, as pre-treatments of web based materials (substrate and/or lamination web), or ozone treatment of the molten coating web to enhance interlayer adhesion to the coated polymer.

Adhesive or hot melt lamination of web based materials or multi-layered application of polyolefin dispersions applied by means of a curtain coating may be an alternative technique, in place of co-extrusion coating or extrusion lamination, as a whole, or as a priming alternative for co-extrusion or extrusion laminations.

In general, a coated substrate of the invention can be prepared by selecting the thermoplastic polymers suitable for making each layer, forming a coated substrate of each layer, and bonding the layers, or coextruding or casting one or more layers. Desirably, the coated substrate layers are bonded continuously over the interfacial area between layers.

For each layer, typically, it is suitable to extrusion blend the components and any additional additives, such as slip, antiblock, and polymer processing aids. The extrusion blending should be carried out in a manner, such that an adequate degree of dispersion is achieved. The parameters of extrusion blending will necessarily vary, depending upon the components. However, typically the total polymer deformation, that is, mixing degree, is important, and is controlled by, for example, the screw-design and the melt temperature. The melt temperature during the formation of the coated substrate will depend on its components.

Manufacturing techniques for making structures of the invention include bag stitching, and form-fill-sealing techniques, such as that described in *Packaging Machinery Operation*, Chapter 8: *Form-Fill-Sealing*, by C. Glenn Davis (Packaging Machinery Manufacturers Institute, 2000 K Street, N.W., Washington, D.C. 20006); *The Wiley Encyclopedia of Packaging Technology*, Marilyn Bakker, Editor-in-chief, pp. 364-369 (John Wiley & Sons); U.S. Pat. No. 5,288,531 (Falla et al.), U.S. Pat. No. 5,721,025 (Falla et al.), U.S. Pat. No. 5,360,648 (Falla et al.) and U.S. Pat. No. 6,117,465 (Falla et al.); other manufacturing techniques, such as that discussed in *Plastic Coated Substrates, Technology and Packaging Applications* (Technomic Publishing Co., Inc. (1992)), by Kenton R. Osborn and Wilmer A Jenkens, pp. 39-105. All of these patents and references are incorporated herein by reference. Other manufacturing techniques are disclosed in U.S. Pat. No. 6,723,398 (Chum et al.), incorporated herein by reference.

Post processing techniques, such as radiation treatment and corona treatment, especially for printing applications, can also be accomplished with the materials of the invention.

Sheets of the coated substrates can be bonded by heat sealing, or by use of an adhesive or a stitching process. Heat sealing can be effected using conventional techniques, including, but not limited to, a hot bar, impulse heating, side welding, ultrasonic welding, or other alternative heating mechanisms, as discussed above.

The coated substrates can be made to any thickness, depending upon the application. In one embodiment, the coated substrate has a total thickness of from 20 to 1000 microns, preferably from 20 to 500 microns, more preferably from 20 to 300 microns, and even more preferably from 20 to 250 microns. The permeability may also be adjusted depending upon the application.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and the term also includes polymers prepared from more than two different types of monomers.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term, "olefin-based polymer," as used herein, refers to a polymer that comprises a majority amount of a polymerized olefin monomer, for example ethylene or propylene (based on the weight of the polymer), and optionally, one or more polymerized comonomers.

The term, "ethylene-based polymer," as used herein, refers to a polymer that comprises a majority amount of polymerized ethylene monomers (based on the weight of the polymer), and optionally, one or more polymerized comonomers.

The terms, "ethylene-based interpolymer," "ethylene interpolymer," and like terms, as used herein, refer to a polymer that comprises a majority amount of polymerized ethylene monomers (based on the weight of the polymer), and one or more polymerized comonomers.

The terms, "ethylene-based copolymer," "ethylene copolymer," and like terms, as used herein, refer to a polymer that comprises a majority amount of polymerized ethylene monomers (based on the weight of the polymer), and a comonomer, as the only monomer types.

The term, "ethylene/α-olefin interpolymer," as used herein, refers to a polymer that comprises a majority amount of polymerized ethylene monomers (based on the weight of the interpolymer), a polymerized α-olefin, and optionally, at least one other polymerized comonomer.

The term, "ethylene/α-olefin copolymer," as used herein, refers to a polymer that comprises a majority amount of polymerized ethylene monomers (based on the weight of the interpolymer), and a polymerized α-olefin, as the only monomer types.

The term, "propylene-based polymer," as used herein, refers to a polymer that comprises a majority amount of polymerized propylene monomers (based on the weight of the polymer), and, optionally, one or more polymerized comonomers.

The term, "propylene-based interpolymer," as used herein, refers to a polymer that comprises a majority amount of polymerized propylene monomers (based on the weight of the interpolymer), and one or more polymerized comonomer.

The terms, "propylene-based copolymer," "propylene copolymer," and like terms, as used herein, refer to a polymer that comprises a majority amount of polymerized propylene monomers (based on the weight of the polymer), and a comonomer, as the only monomer types.

The term, "propylene/α-olefin interpolymer," as used herein, refers to a polymer that comprises a majority amount of polymerized propylene monomers (based on the weight of the interpolymer), a polymerized α-olefin, and optionally, at least one other polymerized comonomer.

The term, "propylene/α-olefin copolymer," as used herein, refers to a polymer that comprises a majority amount of polymerized propylene monomers (based on the weight of the interpolymer), and a polymerized α-olefin, as the only monomer types.

The term, "propylene/ethylene interpolymer," as used herein, refers to a polymer that comprises a majority amount of polymerized propylene monomers (based on the weight of the interpolymer), polymerized ethylene, and optionally, at least one other polymerized comonomer.

The term, "propylene/ethylene copolymer," as used herein, refers to a polymer that comprises a majority amount of polymerized propylene monomers (based on the weight of the interpolymer), and polymerized ethylene, as the only monomer types.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure, not specifically delineated or listed.

Test Procedures

The densities of the ethylene-based polymers and propylene-based polymers, and blends thereof, are measured in accordance with ASTM D-792-00. ASTM D-792-00 can also be used to measure density of other polymers as noted in this test.

Melt indexes (I2) of ethylene-based polymers, and bends thereof, are measured in accordance with ASTM D-1238-04, condition 190° C./2.16 kg. ASTM D-1238-04 can also be used to measure melt index of other polymers as noted in this test.

The melt flow rates (MFR) of propylene-based polymers, and blends thereof, are measured in accordance with ASTM D-1238-04, condition 230° C./2.16 kg.

GPC

The molecular weight distributions for the ethylene-based polymers can be determined with a chromatographic system consisting of either a Polymer Laboratories Model PL-210 or a Polymer Laboratories Model PL-220. The column and carousel compartments are operated at 140° C. The columns are three Polymer Laboratories, 10-micron Mixed-B columns. The solvent is 1,2,4 trichlorobenzene. The samples are prepared at a concentration of 0.1 grams of polymer in 50 milliliters of solvent. The solvent used to prepare the samples contains 200 ppm of butylated hydroxytoluene (BHT). Samples are prepared by agitating lightly for two hours at 160° C. The injection volume is 100 microliters, and the flow rate is 1.0 milliliters/minute.

A fifth-order polynomial fit of the calibration of the gel permeation chromatography (GPC) column set, is performed with 21 narrow molecular weight distribution, polystyrene standards, with molecular weights ranging from 580 to 8,400,000, arranged in six "cocktail" mixtures, with at least a decade of separation between individual molecular weights. The standards are purchased from Polymer Laboratories (UK). The polystyrene standards are prepared at 0.025 grams in 50 milliliters of solvent for molecular weights equal to, or greater than, 1,000,000, and at 0.05 grams in 50 milliliters of solvent for molecular weights less than 1,000,000. The polystyrene standards are dissolved at 80° C. with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0.

Polyethylene equivalent molecular weight calculations are performed using Viscotek TriSEC software Version 3.0. The molecular weights for propylene-based polymers can be determined using Mark-Houwink ratios according to ASTM D6474.9714-1, where, for polystyrene a=0.702 and log K=−3.9, and for polypropylene, a=0.725 and log K=−3.721. For propylene-based samples, the column and carousel compartments are operated at 160° C.

Number average molecular weight, Mn, of a polymer is expressed as the first moment of a plot of the number of molecules in each molecular weight range, against the molecular weight. In effect, this is the total molecular weight of all molecules divided by the number of molecules, and is calculated in the usual manner according to the following formula:

$$Mn = \Sigma ni\, Mi / \Sigma ni = w / \Sigma(wi/Mi),$$

where ni=number of molecules with molecular weight Mi; w=total weight of material; and Σni=total number of molecules.

Weight average molecular weight, Mw, is calculated in the usual manner according to the following formula: Mw=Σwi*Mi, where wi* and Mi are the weight fraction and molecular weight, respectively, of the ith fraction eluting from the GPC column.

The ratio of these two molecular weight averages ($M_w$ and $M_n$), the molecular weight distribution (MWD or Mw/Mn), is used herein to define the breadth of the distribution of molecular weights.

Vicat softening temperatures are measured in accordance with ASTM D1525-07. The term "softening temperature," as used herein, refers to the Vicat softening temperature.

The melting point (Tm) for ethylene-based and propylene-based polymers, and blends thereof, can be determined by Differential Scanning calorimetry (DSC), using a TA Instruments Model Q1000 Differential Scanning calorimeter. A sample of around "5 to 8 mg" size is cut from the material to be tested, and placed directly in the DSC pan for analysis. The sample is first heated, at a rate of about 10° C./min, to 180° C., for ethylene-based polymers (230° C. for propylene-based polymers), and held isothermally for three minutes at that temperature, to ensure complete melting (the first heat). Then the sample is cooled at a rate of 10° C. per minute to −60° C. for ethylene-based polymers (−40° C. for propylene-based polymers), and held there isothermally for three minutes, after which, it is again heated (the second heat) at a rate of 10° C. per minute, until complete melting. The thermogram from this second heat is referred to as the "second heat curve." Thermograms are plotted as "watts/gram versus temperature."

The percent crystallinity in the ethylene-based polymers may be calculated using heat of fusion data, generated in the second heat curve (the heat of fusion is normally computed automatically by typical commercial DSC equipment, by integration of the relevant area under the heat curve). The equation for ethylene-based samples is: % Cryst.=($H_f$÷292 J/g)×100; and the equation for propylene-based samples is: % Cryst.=($H_f$÷165 J/g)×100. The "% Cryst." represents the percent crystallinity and "$H_f$" represents the heat of fusion of the polymer, in Joules per gram (J/g).

The melting point(s) (Tm) of the polymers can be determined from the second heat curve obtained from DSC, as described above. The crystallization temperature (Tc) can be determined from the first cooling curve. The term "Tm1," as used herein, refers to the highest DSC polymer (or blend) melting point.

Experimental

Materials

The polymeric resins used in this study are shown on Table 1. All of the resins listed, contained one or more processing additives and one or more stabilizers.

Table 2 lists the fabrication conditions for the fabricated coated substrates, as described in Table 3 and FIG. 1.

TABLE 1

Resins for Extrusion Coating

| Resin or Resin Blend | Density (g/cc) | MFR (g/10 min, 2.16 kg) at 230° C. | Tm (° C.) | Vicat (° C.) | Type |
|---|---|---|---|---|---|
| (PP500/ PE500) | 0.885 | 20 (230° C.) | 108 | 66 | 60-90 wt % Propylene/Ethylene Copolymer plus 10-40 wt % LDPE |

TABLE 1-continued

| Resins for Extrusion Coating | | | | | |
|---|---|---|---|---|---|
| (PP702) | 0.900 | 42 (230° C.) | 145 | 135 | Random propylene/ethylene copolymer |

| Resin or Resin Blend | Density (g/cc) | MFI (g/10 min, 2.16 kg) | Tm (° C.) | Vicat (° C.) | Type |
|---|---|---|---|---|---|
| (PE704) | 0.9215 | 4.1 (190° C.) | 110 | 98 | LDPE |
| (PEHe58/ PEHo58/PE58) | 0.911 | 7.0 (190° C.) | 124 | 102 | Ethylene/Octene Copolymer Blend |
| (PEHe206/ PEHo206/PE206) | 0.919 | 8.0 (190° C.) | 124 | 102 | Ethylene/Octene Copolymer Blend |

He = heterogeneously branched, and Ho = homogeneously branched (substantially linear).

Coated Substrate Fabrication

Coated substrates were prepared by a co-extrusion coating, with select polymer composition, of a commercially available woven polypropylene web (60 g/m2). Each coated substrate was prepared by applying slip-sheets of the woven polypropylene fabric onto a moving web of a KRAFT paper substrate before the laminator. Each co-extrusion coating was performed with a feed block system, in combination with a coat hanger die. Processing conditions are shown in Table 2 below.

Extruder A: 3.5"×32D (32:1 L/D) Klöckner ErWePa—Single Flight General Purpose Screw.
Extruder B: 2.5"×30D (30:1 L/D) Klöckner ErWePa—Single Flight General Purpose Screw.
Extruder C: 2"×24D (24:1 L/D) Klöckner ErWePa—Single Flight General Purpose Screw.

Temperature settings used for the extruders, feedblock, and die, were set at 290° C. Melt temperature and relative output, were recorded after reaching steady state.

The applied total coating weight is controlled by controlling the thickness profile in CD (cross direction) of the moving substrate) and in MD (machine direction) by controlling the total output of the melt delivered through the coating die. The thickness profile (CD control) is maintained with the automatic die, ErWePa series 510A, linked to a on-line thickness measurement. The total polymer output is calculated and automatically controlled with ErWePa Exact process control system, including line speed, temperature settings, etc. The polymer output per extruder is maintained at the desired pre-selected level/percentage by a Siemens Gradex S7gravimetric control system. The feedblock defines the coextruded layer structure which corresponds with the number polymer types fed to the feedblock. The layer thickness in the applied coextruded web delivered from the die corresponds to the output delivered by extruder relative to the total output and coating weight.

Samples of coated substrates were taken only under stable coating conditions with stable web edges and coating weight. The laminator settings for the coatings and web samples are indicated in Table 2, using 9 mm nip off-set and a matt chill roll cooled with water at 20° C. Coated substrates are shown in Table 3 below.

To determine total coating weight applied to the web, the following method is used. The amount of coating is expressed as a weight per area, (g/m2), and is obtained by subtracting the weight of web from the weight of coated web. The weight is established by measuring the average weight of at least five samples obtained across the substrate web (and coated web) width, by die cutting discs of $100 \text{ cm}^2$ ($0.01 \text{ m}^2$). Each weight was measured on a Mettler Toledo PB 8001-S Balance. The thickness of each extrusion coated layer is calculated from the layer percentage relative to the total coating weight measured as shown in Table 2.

TABLE 2

| Fabrication Conditions for Coated Substrates | | | | | | | | |
|---|---|---|---|---|---|---|---|---|
| | Coated Substrate | FFS1 | FFS2 | FFS3 | FFS4 | FFS5 | FFS6 | FFS7 |
| Extruder A | Polymeric Resins | PP702/ PE704 Blend | PP500/ PE500 | PP500/ PE500 | PE704 | PEHe58/ PEHo58/PE58 | PEHe206/ PEHo206/PE206 | PEHe206/ PEHo206/PE206 |
| Extruder A | Adapter Melt temperature ° C. | 294 | 295 | 294 | 295 | 295 | 296 | 297 |
| Extruder A | Relative Output (%) | 80.3 | 65.8 | 80.8 | 67.9 | 59.8 | 58.9 | 69 |
| Extruder B | Polymeric Resins | PP702/ PE704 Blend | PP702/ PE704 Blend | PP500/ PE500 | PE704 | PEHe58/ PEHo58/PE58 | PEHe206/ PEHo206/PE206 | PEHe206/ PEHo206/PE206 |
| Extruder B | Adapter Melt temperature ° C. | 303 | 304 | 205 | 300 | 305 | 305 | 305 |
| Extruder B | Relative Output (%) | 19.6 | 14.7 | 19.1 | 21.8 | 20 | 21 | 19.4 |
| Extruder C | Polymeric Resins | Not Used | PP500/ PE500 | Not Used | PP500/ PE500 | PP500/ PE500 | PP500/ PE500 | PP500/ PE500 |
| Extruder C | Adapter Melt temperature ° C. | | 275 | | 280 | 282 | 283 | 283 |
| Extruder C | Relative Output (%) | | 19.4 | | 10.1 | 20 | 19.9 | 11.4 |

TABLE 2-continued

Fabrication Conditions for Coated Substrates

| | Coated Substrate | FFS1 | FFS2 | FFS3 | FFS4 | FFS5 | FFS6 | FFS7 |
|---|---|---|---|---|---|---|---|---|
| Line Data | Feedblock *(second layer) | *B/A | *C/A/B | *B/A | *C/A/B | *C/A/B | *C/A/B | *C/A/B |
| Line Data | Air Gap (mm) | 180 | 180 | 180 | 180 | 249 | 249 | 249 |
| Line Data | Line speed (mpm) | 152 | 150 | 150 | 150 | 101 | 102 | 101 |
| Line Data | Checked Weight (g/m2) | 24.18 | 25.5 | 24.8 | 51.5 | 25 | 25 | 40 |

*Second layer adjacent to (in contact with) the web.

TABLE 3

Coated Substrates (Inventive Substrates are FFS 3, 5-7)

| Coated Subst. | Composition for First Layer | First Layer g/m2 | Composition for Second Layer | Second Layer g/m2 | Web Woven (PP)* | Tm1 (° C.)** | HSIT*** >5N/ 15 mm (° C.) | Heat Seal Range, (° C.) (without tape shrinkage) | Seal Strength (N/15 mm) at 130° C. |
|---|---|---|---|---|---|---|---|---|---|
| FFS 1 | PP702/PE704 Blend | 20 | PP702/PE704 Blend | 5 | yes | 145 | 126 | 4 | 7.2 |
| FFS 2 | PP702/PE704 Blend | 5 | PP500/PE500 | 20 | yes | 145 | 123 | 7 | 12.3 |
| FFS 3 | PP500/PE500 | 20 | PP500/PE500 | 5 | yes | 108 | 72 | 58 | 15.3 |
| FFS 4 | PE704 | 45 | PP500/PE500 | 5 | yes | 110 | 105 | 25 | 14.9 |
| FFS 5 | (PEHe58/PEHo58/PE58) | 20 | PP500/PE500 | 5 | yes | 124 | 97 | 33 | 13.2 |
| FFS 6 | PEHe206/PEHo206/PE206) | 20 | PP500/PE500 | 5 | yes | 124 | 105 | 25 | 14.8 |
| FFS 7 | PEHe206/PEHo206/PE206) | 35 | PP500/PE500 | 5 | yes | 124 | 104 | 25 | 28.9 |

*Shrinkage temperature of web = 145° C.; Tm2a − 20° C. ≥ 125° C.
**Tm1 is the highest polymer (or blend) melting point of the composition as determined by DSC
***HSIT: Heat Seal Initiation Temperature is the temperature at which a "heat seal strength" greater than "5N/15 mm" is obtained.

The substrates listed in Table 3 were heat sealed. For each substrate, the first layer was sealed to itself. All samples were sealed using a KOPP Sealer, according to ASTM F2099. After contacting the first layer to first layer, heat was applied from woven web (see FIG. 1). Heat seal strength was determined by preparing seal samples at different temperatures, all samples were conditioned for 48 hour under ambient conditions before testing. Seal condition were as follows: one second contact time with 500N force, both sealing bars heated to the specified temperature (each seal bar is TEFLON coated; width=5 mm for a bond area of "5 mm×15 mm" in center of sample). Sample size used to determine seal strength was "100 mm length×15 mm width."

Figure 2:
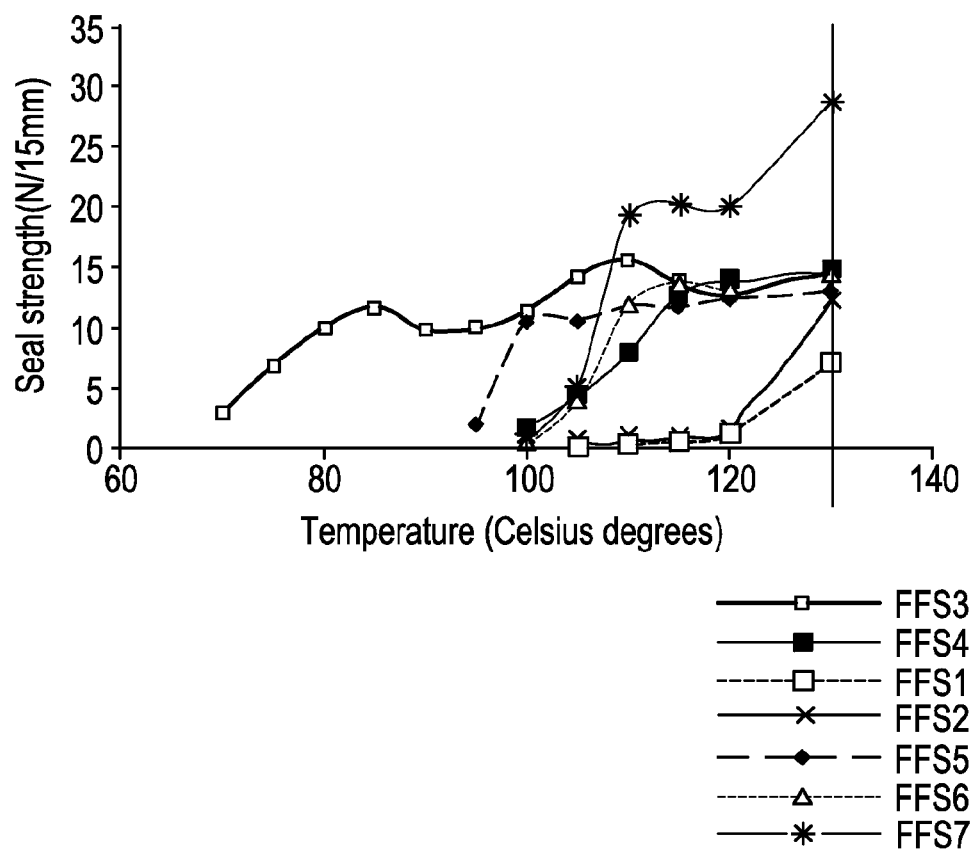
FIG. 2 depicts the seal strength profiles of several coated substrates (seal strength versus temperature at which the seal is prepared).

Seal strength of each coated substrate was determined using an INSTRON 5564 tensile tester, with a clamp distance of 30 mm, and a cross head speed of 100 mm/min. For each temperature, at least 5 samples (seals) were tested in cross direction. The seal performance of each coated substrate is shown in FIG. 2. For sealing temperature greater than 130° C., the web started to shrink when sealed.

As shown in Table 3, the coated substrates of the invention have an excellent combination of heat sealing properties, such as low Heat Seal Initiation Temperatures, wide ranges of sealing temperatures, and high heat seal strength at 130° C. Sample FFS 7, which contains 35 g/m² of its first layer, has significantly higher heat seal strength at 130° C., compared to comparative example FFS 4, which contains 45 g/m² of its first layer.

Although the invention has been described in considerable detail in the preceding examples, this detail is for the purpose of illustration, and is not to be construed as a limitation on the invention as described in the following claims.

The invention claimed is:

1. A coated substrate comprising at least the following:
  i) a first layer formed from a first composition that has a melting point, Tm1, and comprising at least one ethylene-based interpolymer, and wherein the first composition comprises a melt index (I2) from 3 to 20 g/10 min, a melting temperature (Tm1) from 115° C. to 135° C.;
  ii) a second layer formed from a second composition comprising the following: a) at least one propylene-based polymer, and b) a low density polyethylene that has a melt index (I2) from 0.2 to 15 g/10 min, and wherein the second composition has a melt flow rate (MFR) from 10 to 35 g/10 min, and a density from 0.860 to 0.930 g/cc; and
  iii) a woven web formed from at least one propylene-based polymer with a melting point of Tm2a greater than, or equal to, 140° C. and/or a nonwoven web formed from at least one propylene-based polymer with a melting point of Tm2b greater than, or equal to, 140° C.; and
  wherein the first layer is adjacent to the second layer, and the second layer is adjacent to the web; and
  wherein the ratio of the "coating weight of the first layer" to the "coating weight or the second layer" is greater than 3; and
  wherein the coating weight of the first layer is less than, or equal to, 45 g/m².

2. The coated substrate of claim 1, wherein the first composition has a density from 0.910 to 0.930 g/cc.

3. The coated substrate of claim 1, wherein the at least one ethylene-based interpolymer is a heterogeneously branched ethylene/α-olefin interpolymer or a homogeneously branched ethylene/α-olefin interpolymer.

4. The coated substrate of claim 1, wherein the first composition comprises greater than 50 weight percent of a sum weight of a heterogeneously branched ethylene/α-olefin interpolymer and a homogeneously branched ethylene/α-olefin interpolymer, based on the weight of the first composition.

5. The coated substrate of claim 1, wherein the Component iii is a woven web with a Tm2a from 140° C. to 150° C.

6. The coated substrate of claim 1, wherein the coated substrate has seal strength greater than 20 N/15 mm, at a sealing temperature of 130° C.

7. The coated substrate of claim 1, wherein the wherein the ratio of the "coating weight of the first layer" to the "coating weight of the second layer" is greater than 4.

8. The coated substrate of claim 4, wherein the first composition has a density from 0.905 to 0.930 g/cc.

9. The coated substrate of claim 1, wherein the first composition has a melting temperature (Tm) 120° C. to 130° C.

10. A coated substrate of claim 1, wherein the coated substrate consists of the following: i) the first layer, ii) the second layer and iii) the web.

11. A coated substrate of claim 4, wherein the coated substrate consists of the following: i) the first layer, ii) the second layer and iii) the web.

* * * * *